US009738180B2

(12) United States Patent
Ioppolo (10) Patent No.: US 9,738,180 B2
(45) Date of Patent: Aug. 22, 2017

(54) ADJUSTER TRACK ASSEMBLY FOR A VEHICLE SEAT

(71) Applicant: Brose Fahrzeugteile GmbH & Co. Kommanditgesellschaft, Coburg, Coburg (DE)

(72) Inventor: Leo Ioppolo, Washington Township, MI (US)

(73) Assignee: Brose Fahzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 15/008,223

(22) Filed: Jan. 27, 2016

(65) Prior Publication Data
US 2017/0210249 A1    Jul. 27, 2017

(51) Int. Cl.
*B60N 2/07* (2006.01)

(52) U.S. Cl.
CPC .................. *B60N 2/0722* (2013.01)

(58) Field of Classification Search
CPC ................................. B60N 2/0722
USPC ....................................... 248/430
See application file for complete search history.

(56) References Cited

U.S. PATENT DOCUMENTS

| 4,673,217 A * | 6/1987 | Nishiyama | B60N 2/0715 297/468 |
| 4,940,285 A * | 7/1990 | Suzuki | B60N 2/073 248/430 |
| 5,028,028 A | 7/1991 | Yamada et al. | |
| 5,348,261 A * | 9/1994 | Nini | B60N 2/0715 248/424 |
| 7,604,214 B2 * | 10/2009 | Kojima | B60N 2/0705 248/430 |
| 8,172,192 B2 | 5/2012 | Hofmann et al. | |
| 2004/0124683 A1* | 7/2004 | Matsumoto | B60N 2/0705 297/344.1 |
| 2010/0320353 A1* | 12/2010 | Kojima | B60N 2/0705 248/430 |
| 2013/0087674 A1 | 4/2013 | Couasnon | |
| 2016/0101712 A1* | 4/2016 | Hagan | B60N 2/0722 248/429 |

FOREIGN PATENT DOCUMENTS

| DE | 10 2006 016 650 A1 | 10/2007 |
| DE | 20 2006 016 652 U1 | 4/2008 |
| DE | 20 2007 015 163 U1 | 4/2008 |
| WO | WO 2007/115924 A1 | 10/2007 |

* cited by examiner

*Primary Examiner* — Anita M King
(74) *Attorney, Agent, or Firm* — Lewis Roca Rothgerber Christie LLP (57) ABSTRACT

An adjuster track assembly for a vehicle seat includes an upper rail configured to be fastened to the vehicle seat and displaceable in a longitudinal direction, a stationary lower rail, a linear guide provided in the longitudinal direction between the upper rail and the lower rail which includes a bearing element for longitudinal guidance and support of the upper rail. The bearing element includes bearing cages with rollers accommodated within roller pockets having retention areas for guiding said rollers both in the longitudinal direction and the direction perpendicular to the longitudinal direction, and absorption areas for receiving or eliminating wear debris or abrasions.

7 Claims, 6 Drawing Sheets

ADJUSTER TRACK ASSEMBLY FOR A VEHICLE SEAT

TECHNICAL FIELD

The present invention relates to an adjuster track assembly for a vehicle seat.

BACKGROUND

Figure 1:
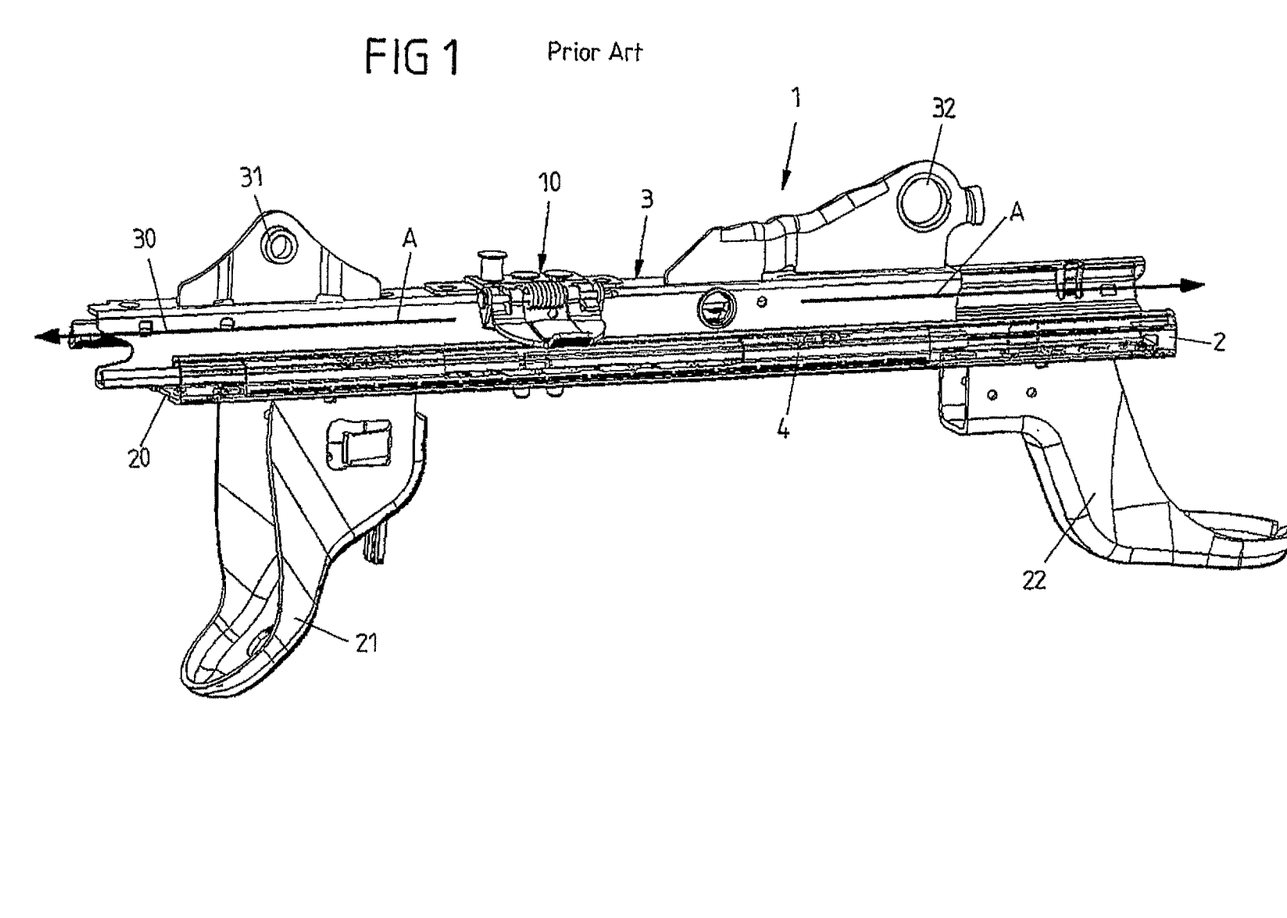
FIG. 1 illustrates an adjuster track assembly for a vehicle seat with a lower and an upper rail in a perspective view.

As shown in FIG. 1 a conventional adjuster track assembly 1 for a vehicle seat has at least one stationary lower rail 2 connected to the vehicle floor via corresponding brackets 21, 22 and a movable upper rail 3 for receiving a vehicle seat via rear and front rockers 31, 32. The upper rail 3 and the lower rail 2 are embodied essentially as U-profiles. They are arranged here with respect to one another so that an essentially rectangular cross-sectional profile results. The lower rail 2 and the upper rail 3, viewed in cross-section each have two legs curved at the ends such that the upper rail 3 is guided in the lower rail 2 so as to be displaceable along the lower rail 2 in a forward and backward direction indicated by arrows A. Positioning of the vehicle seat in the longitudinal direction of the vehicle body can thus be adjusted by sliding the upper rail 3 along the lower rail 2. Between the lower rail 2 and the upper rail 3, there is interposed a lock means 10 for regulating the movement of the upper rail 3 along the lower rail 2.

Figure 2:
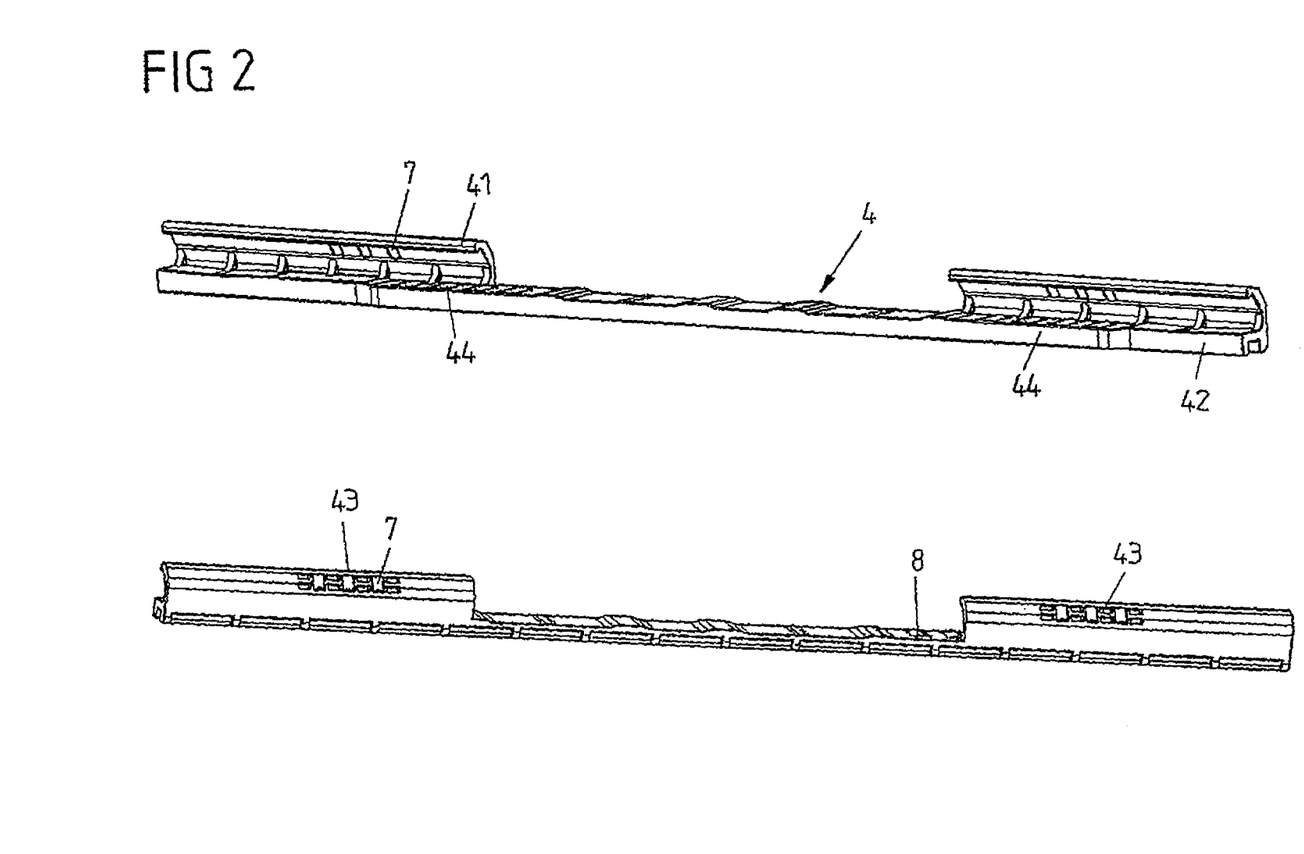
FIG. 2 illustrates a bearing element for guiding the upper rail in a longitudinal direction in a perspective view.

A horizontal leg 20 of the lower rail 2 that forms the bottom of the rectangular profile, and a vertical leg 30 of the upper rail 3 that forms the first side wall of the rectangular profile, engage around one another with their ends and form a lower bearing region. A bearing element 4 for linear guidance and support of the upper rail 3 is provided between the curved ends of the horizontal leg 20 of the lower rail 2 and the vertical leg 30 of the upper rail 3. According to FIG. 2 illustrating the bearing element 4 in different perspective views the bearing element 4 comprises a vertical leg 41 adapted to the vertical leg 20 of the lower rail 2 and a horizontal leg 42 adapted to the vertical leg 30 of the upper rail 3.

Figure 3:
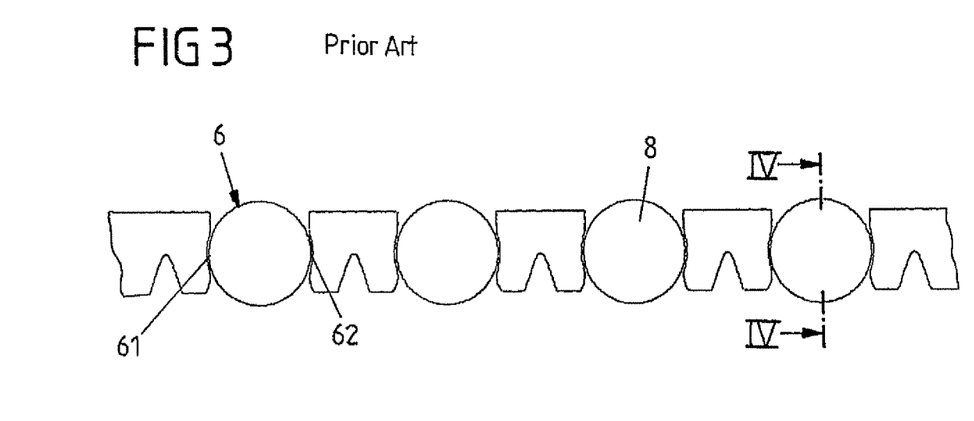
FIG. 3 illustrates a schematic side view in the longitudinal direction of a bearing cage with roller pockets and rollers accommodated therein.
Figure 4:
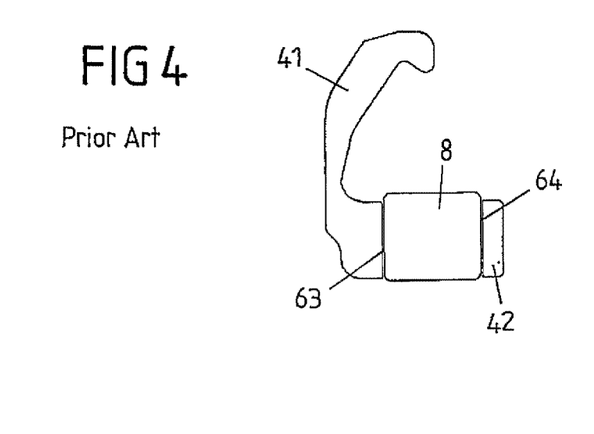
FIG. 4 illustrates a cross-section of the bearing cage, a roller pocket and a roller perpendicular to the longitudinal direction along the section line IV-IV in FIG. 3.
Figure 5:
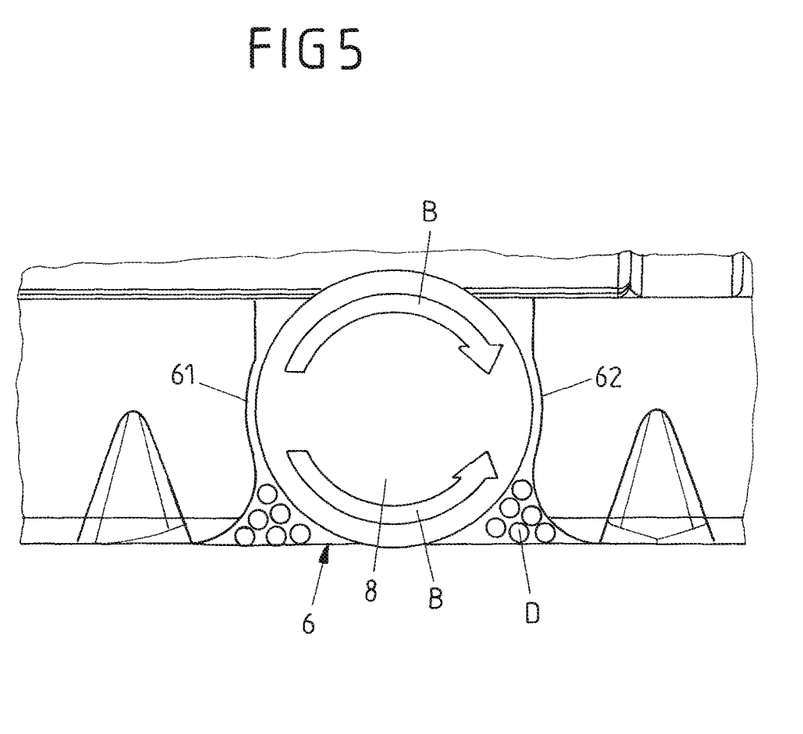
FIG. 5 illustrates a schematic side view of a roller in a roller pocket of a bearing cage and paint particles and shavings lodged in the roller pockets.

The curved end of the vertical leg 41 of the bearing element 4 includes upper bearing cages 43 with rollers 7 whereas the horizontal leg 42 of the bearing element 4 includes lower bearing cages 44 which according to FIGS. 3-5 comprise roller pockets 6 and rollers 8 accommodated therein.

When the upper rail 3 is displaced relative to the lower rail 2, the bearing element 4 with its bearing cages 43, 44 is carried along with the upper rail 3. During this process, the bearing element 4 supports the upper rail 3 on the lower rail 2 by means of rollers 7, 8 accommodated within roller pockets of the bearing cages 43, 44. According to the cross-section along the section line IV-IV in FIG. 3 shown in FIG. 4 and the enlarged illustration of FIG. 5 depicting a section of the lower bearing cages 44 the rollers 8 are retained both in the forward and backward direction, i.e. in the longitudinal adjustment direction of the adjuster track assembly, within concaved valleys 61, 62 of the roller pockets 6 and between side walls 63, 64 of the roller pockets 6 in the cross-car direction, i.e. perpendicular to the longitudinal adjustment direction of the adjuster track assembly.

Typically, in such an adjustment mechanism of a vehicle seat two lower rails are arranged parallel to one another in the longitudinal direction of the vehicle, whereby the vehicle seat is fastened to the two upper rails displaceably mounted in their corresponding lower rails.

In the adjuster track assembly the bearing cages 43, 44 are designed to allow for the upper and lower rails 2, 3 to move within a defined track effort range. Once the upper and lower rails 2, 3 are mated to form the rail kit, they undergo a break-in cycle. This operation cycles the upper rail 3 in the forward and backward direction through the functional travel range to ensure proper distribution of grease throughout all moving components.

During the initial break-in cycle the rollers 7, 8 rotate according to the arrows B of FIG. 5 and begin to remove sections of an electrophoretic anticorrosive coating for protecting the upper and lower rail 2, 3 against corrosion from the contact surface of the upper and lower rail 2, 3 as well as plastic or metal shavings or abrasions of the bearing element 4. The paint particles and shavings follow the flow of grease and get lodged as debris and abrasions D into the roller pockets 6 of the lower bearing cages 44, in particular. This causes increased rotational efforts or even a complete binding of the rollers 82 accommodated in the roller pockets 6 of the lower bearing cages 44. This results in high track efforts, leading to a higher number of rejected parts and quality as well as warranty issues.

SUMMARY OF THE INVENTION

It is an object of the present invention to reduce rotational efforts or even a complete binding of the rollers and consequently high track efforts.

It is an additional object of the present invention to provide less scrap and to reduce the number of rejected parts and the down time at the assembly line.

Furthermore, it is an object of the present invention to improve the quality of the adjuster track assembly for a vehicle seat as well as the speed of operation.

In accordance with an aspect of the present invention, the adjuster track assembly for a vehicle seat comprises an upper rail that is configured to be fastened to the vehicle seat and is displaceable in a longitudinal direction, a stationary lower rail, a linear guide provided in the longitudinal direction between the upper rail and the lower rail, the linear guide including a bearing element for longitudinal guidance and support of the upper rail; whereby said bearing element comprises a bearing cage with roller pockets and rollers accommodated therein, and whereby said roller pockets comprise retention areas for guiding the rollers both in the longitudinal direction and the direction perpendicular to the longitudinal direction, and absorption areas for receiving or eliminating wear debris or abrasions.

By adding absorption areas for receiving or eliminating wear debris or abrasions to the geometry of the bearing cage, which are not placed in the retention areas for guiding the rollers both in the longitudinal direction and the direction perpendicular to the longitudinal direction a free flow and exit of plastic abrasions resulting from the bearing cage and paint debris resulting from the anticorrosive coating of the upper and lower rail rotational efforts are reduced and even a complete binding of the rollers is prevented resulting in less scrap, a reduced number of rejected parts and a reduction of the down time at the assembly line.

Furthermore, the quality of the adjuster track assembly for a vehicle seat as well as the speed of operation is improved.

In embodiments of the present invention the absorption areas comprise recesses either at a front face or at both front faces of said rollers perpendicular to the longitudinal direction.

In a further aspect, the recesses are semi-circular in cross-car direction with the open side facing toward the lower rail allowing a free flow and exit of plastic abrasions resulting from the bearing cage and wear and paint debris resulting from the anticorrosive coating of the upper and lower rail debris or abrasions.

In another aspect, the absorption areas comprise cavities adjacent the lower roller portions facing toward the lower rail for receiving those plastic abrasions, wear and paint debris which is thus prevented from lodging into the bearing cages resulting in high track efforts, leading to a higher number of rejected parts and quality as well as warranty issues.

In an embodiment of the present invention the bearing cage has an L-shaped cross section perpendicular to the longitudinal direction with a carrier leg comprising a plurality of recesses in longitudinal direction, several of said recesses being adapted to receive said rollers, and a guidance leg for guiding said upper rail in said lower rail.

Furthermore, said bearing cage may either consist of plastic material of aluminium or an aluminium alloy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Subsequently, embodiments of the invention shall be described in detail with reference to the drawings. In the drawings, like reference numerals designate like structural elements.

Figure 6:
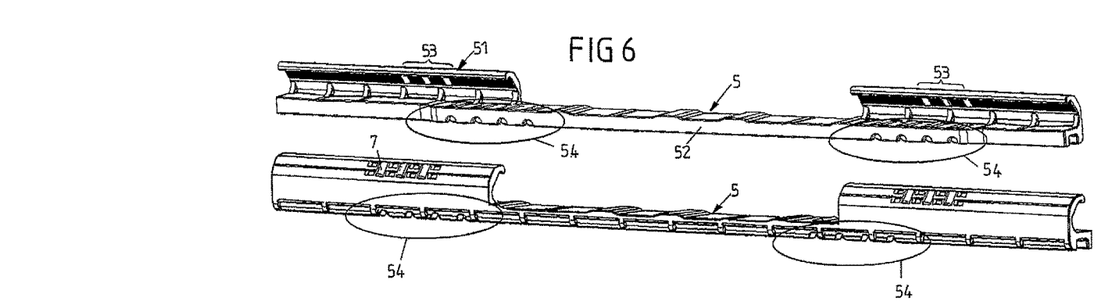
FIG. 6 illustrates different perspective views of a bearing element with bearing cages comprising roller pockets and rollers.

FIG. 6 shows in different perspective views a bearing element 5 which according to FIG. 1 is to be inserted into a stationary lower rail 2 for guiding an upper rail 3 of an adjuster track assembly 1 for a vehicle seat and is preferably made of either plastic material or aluminium or an aluminium alloy.

The bearing element 5 is adapted to the structure and design of the lower bearing region which—according to FIG. 1—is formed by the curved ends of the horizontal leg 20 of the lower rail 2 and the vertical leg 30 of the upper rail 3. The bearing element 5 comprises a vertical leg 51 adapted to the vertical leg 20 of the lower rail 2 and a horizontal leg 52 adapted to the vertical leg 30 of the upper rail 3. The curved end of the vertical leg 51 of the bearing element 5 includes upper bearing cages 53 with roller pockets and rollers 7 accommodated therein. The horizontal leg 52 of the bearing element 5 includes lower bearing cages 54 which according to the enlarged illustration of FIG. 7 comprise roller pockets 9 and rollers 8 accommodated therein.

Figure 7:
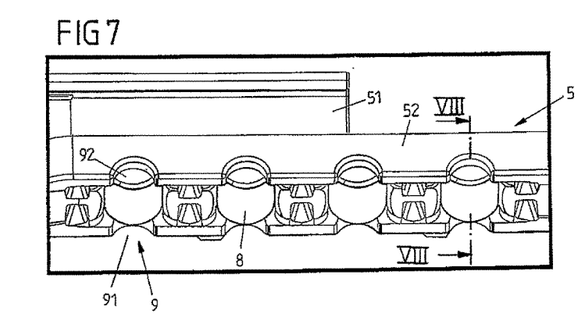
FIG. 7 illustrates a perspective partial view of the bearing element according to FIG. 6 with bearing cages including roller pockets with both retention areas for guiding rollers and absorption areas for receiving or eliminating wear debris or abrasions.

When the upper rail 3 is displaced relative to the lower rail 2, the bearing element 5 with its bearing cages 54 is carried along with the upper rail 3. During this process, the bearing element 5 supports the upper rail 3 on the lower rail 2 by means of its rollers 8 accommodated within the roller pockets 9 of the bearing cages 54.

Figure 8:
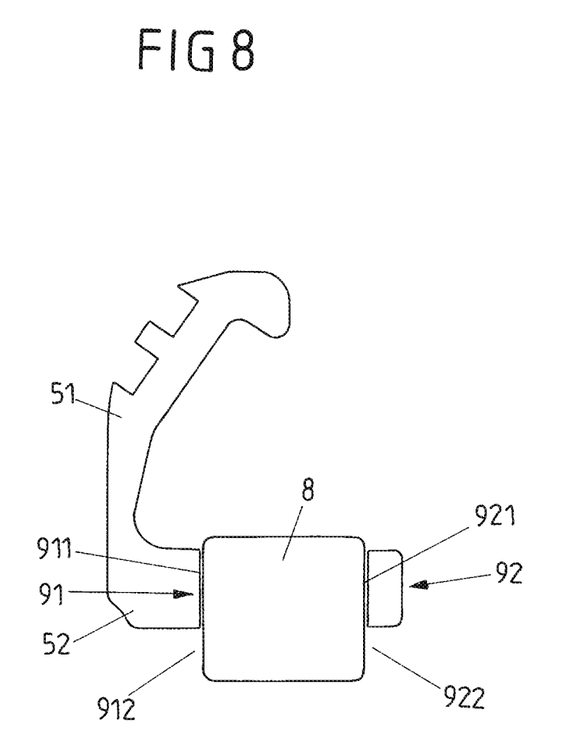
FIG. 8 illustrates a cross-section of the bearing cage, a roller pocket and a roller perpendicular to the longitudinal direction of the bearing cage along the section line VIII-VIII in FIG. 7.

According to FIG. 7 and the cross-section of FIG. 8 taken along the section line VIII-VIII in FIG. 7 which precisely runs through a roller 8, the rollers 8 are retained both in the forward and backward direction, i.e. in the longitudinal adjustment direction of the adjuster track assembly, within concaved valleys of the roller pockets 9 corresponding to the structure of the roller pockets 6 according to FIG. 3 and between side walls 91, 92 of the roller pockets 9 in the cross-car direction, i.e. perpendicular to the longitudinal adjustment direction of the adjuster track assembly.

However, differing from the structure of the side walls 63, 64 of the roller pockets 6 according to FIG. 4 covering the complete side walls of the rollers 8 the side walls 91, 92 comprise retention areas 911, 921 for guiding the rollers 8 in the cross-car direction and absorption areas 912, 922 for receiving or eliminating wear debris or abrasions. As shown in the perspective view of FIG. 7 the absorption areas 912, 922 consist of semi-circular recesses at both front faces of the rollers 8 in the cross-car direction with the open side facing toward the lower rail 2.

Differing from the embodiment shown in FIGS. 6-8 the absorption areas may consist of cavities adjacent the lower roller portions facing toward the lower rail 2.

By adding either recesses and/or cavities as absorption areas 912, 922 to the geometry of the bearing cage 54, which are not placed in the retention areas 911, 921 for guiding the rollers 8 both in the longitudinal direction and the direction perpendicular to the longitudinal direction a free flow and exit of plastic abrasions resulting from the bearing cages 53, 54 and paint debris resulting from the anticorrosive coating of the upper rail 3 and the lower rail 2 during an initial break-in cycle rotational efforts are reduced and even a complete binding of the rollers is prevented resulting in less scrap, a reduced number of rejected parts and a reduction of the down time at the assembly line.

Moreover, the quality of the adjuster track assembly for a vehicle seat as well as the speed of operation is improved.

REFERENCE NUMERALS 1 adjuster track assembly
2 lower rail 3 upper rail
4, 5 bearing element
6 roller pockets
7, 8 rollers
9 roller pockets
10 lock means
20 horizontal leg of the lower rail
30 vertical leg of the upper rail
41, 51 vertical leg of bearing element
42, 52 horizontal leg of bearing element
43, 53 upper bearing cages
44, 54 lower bearing cages
61, 62 concaved valleys of the roller pockets
63, 64 side walls of the roller pockets
91, 92 side walls
911, 921 retention areas
912, 922 absorption areas
D debris and abrasion

The invention claimed is:

1. An adjuster track assembly for a vehicle seat, the adjuster track comprising:
   an upper rail that is configured to be fastened to the vehicle seat and is displaceable in a longitudinal direction;
   a stationary lower rail;
   a linear guide provided in the longitudinal direction between the upper rail and the lower rail, the linear guide including a bearing element for longitudinal guidance and support of the upper rail;
   said bearing element comprising a bearing cage with roller pockets and rollers accommodated therein;
   said roller pockets having retention areas for guiding said rollers both in the longitudinal direction and in a direction perpendicular to the longitudinal direction, and
   absorption areas for receiving or eliminating wear debris or abrasions, wherein said absorption areas comprise recesses at least one front face of said rollers perpendicular to the longitudinal direction.

2. The adjuster track assembly of claim 1, wherein said recesses are semi-circular in a cross-car direction with an open side facing toward the lower rail.

3. The adjuster track assembly of claim 1, wherein said bearing cage comprises plastic material.

4. The adjuster track assembly of claim 1, wherein said bearing cage comprises aluminium or an aluminium alloy.

5. The adjuster track assembly of claim 1, wherein said recesses are semi-circular in a cross-car direction with an open side facing toward the lower rail.

6. An adjuster track assembly for a vehicle seat comprising:
   an upper rail that is configured to be fastened to the vehicle seat and is displaceable in a longitudinal direction;
   a stationary lower rail;
   a linear guide provided in the longitudinal direction between the upper rail and the lower rail, the linear guide including a bearing element for longitudinal guidance and support of the upper rail;
   said bearing element comprising a bearing cage with roller pockets and rollers accommodated therein;
   said roller pockets having retention areas for guiding said rollers both in the longitudinal direction and in a direction perpendicular to the longitudinal direction, and
   absorption areas for receiving or eliminating wear debris or abrasions, wherein said absorption areas comprise cavities adjacent the lower roller portions facing toward the lower rail.

7. An adjuster track assembly for a vehicle seat comprising:
   an upper rail that is configured to be fastened to the vehicle seat and is displaceable in a longitudinal direction;
   a stationary lower rail;
   a linear guide provided in the longitudinal direction between the upper rail and the lower rail, the linear guide including a bearing element for longitudinal guidance and support of the upper rail;
   said bearing element comprising a bearing cage with roller pockets and rollers accommodated therein;
   said roller pockets having retention areas for guiding said rollers both in the longitudinal direction and in a direction perpendicular to the longitudinal direction, and
   absorption areas for receiving or eliminating wear debris or abrasions,
wherein said bearing cage has an L-shaped cross section perpendicular to the longitudinal direction with
a carrier leg comprising a plurality of recesses in longitudinal direction, several of said recesses being adapted to receive said rollers, and
a guidance leg for guiding said upper rail in said lower rail.

* * * * *

UNITED STATES PATENT AND TRADEMARK OFFICE
CERTIFICATE OF CORRECTION

PATENT NO. : 9,738,180 B2  
APPLICATION NO. : 15/008223  
DATED : August 22, 2017  
INVENTOR(S) : Leo Ioppolo

Page 1 of 1

It is certified that error appears in the above-identified patent and that said Letters Patent is hereby corrected as shown below:

In the Claims

Column 5, Line 39, Claim 1    Delete "recesses at least",  
Insert --recesses at at least--

Signed and Sealed this  
Sixteenth Day of October, 2018

Andrei Iancu  
*Director of the United States Patent and Trademark Office*